Aug. 22, 1961 S. A. LÖVSTEDT 2,997,572
WELDING ELECTRODE HOLDERS
Filed Feb. 8, 1960
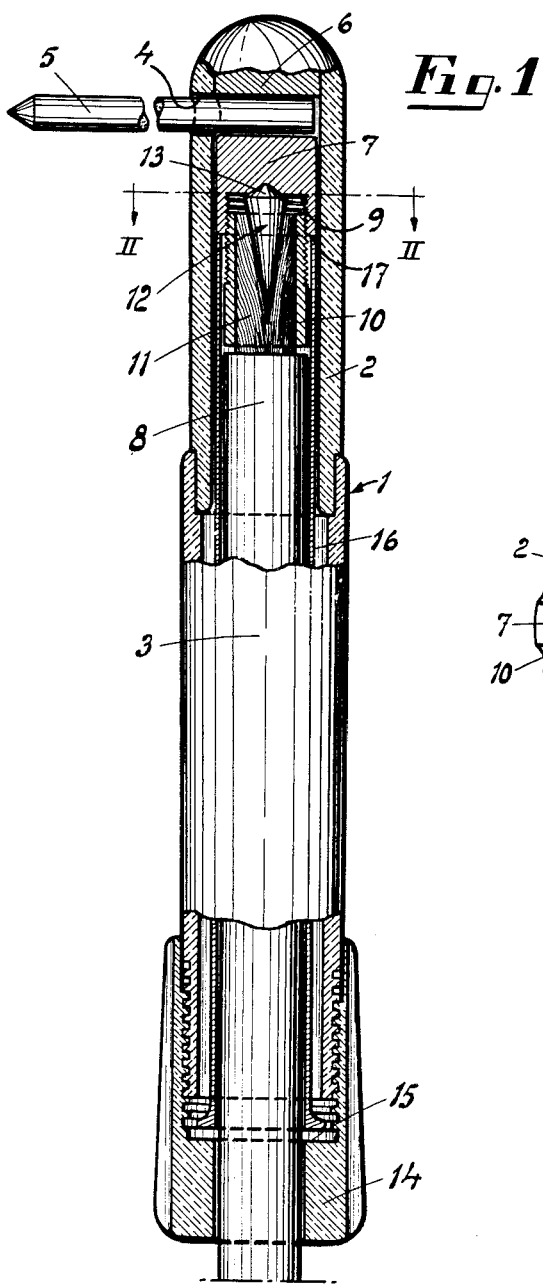
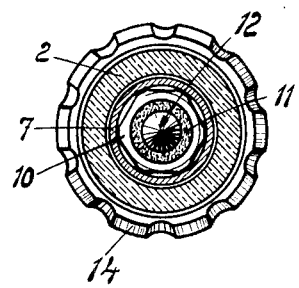
INVENTOR
STIG ARVID LÖVSTEDT
BY Linton and Linton
ATTORNEYS

2,997,572
WELDING ELECTRODE HOLDERS

Stig Arvid Lövstedt, Landskrona, Sweden, assignor to Olof Lakander & Co. Aktiebolag, Goteborg, Sweden
Filed Feb. 8, 1960, Ser. No. 7,354
Claims priority, application Sweden Feb. 16, 1959
4 Claims. (Cl. 219—142)

The present invention relates to welding electrode holders of the kind which are in the form of an elongated casing provided at one end with a lateral opening for receiving one end portion of a welding electrode and at the other end with a handle portion. More specifically, the invention relates to electrode holders of this general kind and of the type which comprise a fixed clamping member arranged within the holder at the end provided with said lateral opening, a contact piece displaceable in the holder longitudinally thereof for clamping the end of an electrode between said clamping member and said contact piece, and a welding current cable extending longitudinally through the holder and being connected to said contact piece.

Previously known electrode holders of this type comprise an elongated handle portion and a head portion provided with the attachment means for the electrode, said head portion being rotatable relative to the handle portion. Clamping of the electrode by means of the movable contact piece is effected by rotating the head portion relative to the handle portion. This type of electrode holder has the drawback that during work the electrode will often be loosened from the holder due to unintentional rotation of the head portion relative to the handle portion. The electrode which projects from the head portion at or nearly at right angles to the axis of rotation of the head portion forms in fact a lever, and only a very small force need be applied to the end of this lever in order to rotate the head portion.

The above-mentioned drawback is overcome by the present invention which is mainly characterised in that said handle portion is made in one piece with or firmly secured to the portion of the holder provided with said lateral opening and in that said handle portion is provided, at the end opposite said lateral opening, with a sleeve being in threaded engagement therewith, a casing enclosing said welding current cable being arranged within the holder between said contact piece and said sleeve for transmitting to said contact piece the axial component of the movement of said sleeve when the same is screwed onto said handle portion.

The sleeve which is secrewed on to the end of the handle portion may be provided, according to the invention, with an internal annular shoulder co-operating with one end of the casing enclosing the welding current cable, the opposite end of said casing being adapted to abut against an annular shoulder on the contact piece.

When using an electrode holder of the type hereinbefore set forth, the welding current cable often becomes twisted and entangled due to the holder being turned about its longitudinal axis. In order to straighten the cable it is necessary, when using electrode holders of previously known types, to rotate the holder. This is rather inconvenient, especially since the tip of the electrode attached to the holder will describe a wide circle when the holder is rotated.

According to the present invention this drawback may be eliminated in a preferred embodiment by arranging the holder in such a way, that the contact piece, when not pressed against the end of an electrode inserted in the holder, is freely rotatable within the holder together with the welding current cable. The contact piece may then preferably be of cylindrical shape, the holder having a corresponding circular form internally in the portion provided with the lateral opening for the electrode.

One embodiment of the invention is illustrated in the accompanying drawing, wherein:

FIGURE 1 is a side view, partly in section, of an electrode holder according to the invention with an electrode clamped therein, and FIGURE 2 is a cross section taken on the line II—II in FIGURE 1.

The electrode holder comprises an elongated cylindrical casing 1 which, in the embodiment shown, consists of two fixedly interconnected tubular members 2 and 3. The casing 1 may of course be made in one piece. In the upper closed end portion of the casing 1, according to FIGURE 1, there is arranged a lateral opening 4 for the insertion of the end portion of a welding electrode 5. The end portion of the electrode 5 situated within the casing is adapted to be pressed against a clamping member 6 within the closed end of the casing by means of a contact piece in the form of a cylindrical, piston-like member 7 which is axially displaceable in the casing 1 and which is electrically and mechanically connected to a welding current cable 8 axially inserted in the casing from the opposite, open end thereof. The contact piece 7 is provided, at the end opposite the electrode, with a threaded axial bore 9 for receiving an externally threaded sleeve 10 which is placed on the end portion 11 of the cable from which the insulation has been removed. Before the sleeve 10 is screwed into the bore in the contact piece 7 a bi-conical pin 12 is inserted into the cable end from the outer end surface thereof. In the bottom of the bore 9 there is arranged a central seat for the outer end portion 13 of the pin 12, so that when the sleeve 10 is screwed into said bore the conical pin 12 will be pressed into the cable thereby wedging the cable end against the inner surface of the sleeve 10.

The lower end portion of the casing 1, according to FIGURE 1, is provided with external threads for an internally threaded sleeve 14 which is provided internally with an annular shoulder 15. A casing 16 which encloses the power cable and extends axially through the outer casing 1 abuts with its lower, flanged end against the shoulder 15 of the sleeve 14. The opposite end portion of the casing 16 encloses the sleeve 10 connected with the contact piece 7 and has its upper edge abutting against the annular shoulder 17 formed between the contact piece 7 and the sleeve 10, so that when the sleeve 14 at the lower end of the holder is screwed onto the holder its axial movement is transmitted by means of the casing 16 to the contact piece 7 for clamping the electrode between the contact piece 7 and the clamping member 6.

In the embodiment shown the cylindrical contact piece 7 may rotate freely relative to the casing 1 as well as relative to the casing 16 enclosing the welding current cable, the casing 16 also being freely rotatable relative to the casing 1. When the contact piece is not pressed against the electrode 5 it may thus be rotated freely within the casing 1 together with the cable 8 which facilitates straightening of the cable.

The invention is not limited to the embodiment described above and shown in the drawing, said embodiment being susceptible of various modifications with respect to its details without departing from the scope of the invention.

What I claim is:

1. A welding electrode holder of the kind which has an elongated casing provided at one end with a lateral opening for receiving one end portion of a welding electrode and at the other end with a handle portion, a fixed clamping member arranged within the holder at the end provided with said lateral opening, a contact piece displaceable in the holder longitudinally thereof for clamping the end of an electrode between said clamping member and said contact piece, and a welding current cable extending longitudinally through the holder and being connected to said contact piece, characterised in that said handle portion is fixedly connected to the portion of the holder provided with said lateral opening, a sleeve is in threaded engagement with said handle portion, a casing encloses said welding current cable and is arranged within said holder between said contact piece and said sleeve for transmitting to said contact piece the axial component of the movement of said sleeve when the same is screwed onto said handle portion.

2. A welding electrode holder as claimed in claim 1, characterised in that said sleeve screwed onto the end of said handle portion is provided with an internal annular shoulder co-operating with one end of said casing enclosing said welding current cable, the opposite end of said casing being adapted to abut against an annular shoulder on said contact piece.

3. A welding electrode holder as claimed in claim 1, characterised in that said contact piece, when not pressed against the end of an electrode inserted in said holder, is freely rotatable within said holder together with said welding current cable.

4. A welding electrode holder as claimed in claim 3, characterised in that the contact piece is of cylindrical form and in that the holder internally has a corresponding circular form in the portion provided with the lateral opening.

References Cited in the file of this patent

UNITED STATES PATENTS

| | | |
|---|---|---|
| 2,176,137 | Jurkat | Oct. 17, 1939 |
| 2,371,003 | Trinajstich | Mar. 6, 1945 |
| 2,428,409 | Cushman | Oct. 7, 1947 |